UNITED STATES PATENT OFFICE 2,496,960

PRODUCTION OF 4,4'-DIKETO-DICYCLOHEXYL

John R. Schaefgen, Akron, Ohio, assignor to Wingfoot Corporation, Akron, Ohio, a corporation of Delaware No Drawing. Application March 5, 1946, Serial No. 652,230

2 Claims. (Cl. 260—586)

This invention relates to a new method of preparing cyclic ketones and more particularly to a method of preparing ketones having two aliphatic rings each having a ketone group substituted therein. Although some of the compounds which can be synthesized by this method are known, methods heretofore used for their preparation are complex, resulting in small yields or in impure products.

The purpose of this invention is to provide a new and more practicable method of preparing cyclic diketones.

The compounds which can be prepared by the new method may have the structural formula

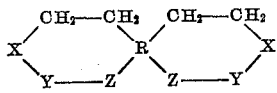

in which R may be

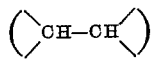

and in which X, Y and Z are radicals of the group consisting of methylene and carbonyl, and in which only one of the radicals X, Y and Z is carbonyl.

The diketones are prepared from the corresponding diphenols by hydrogenation under pressure, preferably in the presence of a nickel catalyst, followed by catalytic dehydrogenation in the presence of a copper chromite catalyst. The diphenols may have the hydroxyl groups substituted in the benzene rings in the ortho, meta, and para positions depending upon the desired position of the ketone group in the compounds to be prepared.

The diketones prepared in accordance with the method of this invention are useful intermediates for the synthesis of octabasic acids by reaction with acrylonitrile and subsequent hydrolysis of the compound thereby prepared. The new compounds are further useful in the preparation of dioximes by reaction with hydroxylamine. The new dioximes may be treated with sulfuric acid or the equivalent to form a new class of dilactams by means of a Beckmann rearrangement.

Further details of the preparation of the new compounds are set forth in the following specific example.

Example

A hydrogenation bomb was charged with 100 grams of p,p'-dihydroxydiphenyl and 350 cc. of methyl alcohol. Twenty-nine grams of finely divided nickel was suspended therein. Hydrogen was passed into the bomb at a pressure of 1900 pounds per square inch and the bomb was maintained at a temperature of 200° C. for 15 hours while its contents were vigorously agitated. During the reaction the drop in hydrogen pressure corresponds to the theoretical amount of hydrogen required to substitute 12 atoms of hydrogen per mole of the dihydroxydiphenyl. The reaction product was removed from the bomb, filtered to remove the suspended nickel catalyst, and evaporated to dryness. A 50 gram sample of the crude 4,4'-dihydroxydicyclohexyl so obtained was dissolved in 50 cc. of phenyl ether, and 13 grams of finely divided copper chromite was added thereto. The solution was then heated for from 2 to 3 hours from 260 to 270° C. During the heating hydrogen was evolved correspondingly approximately to 4 atoms per mole of dihydroxydicyclohexyl. The reaction mass was cooled, digested with hot chloroform and filtered to remove the catalyst. The filtrate was distilled first at atmospheric pressure to remove the chloroform and then at 1 mm. to separate the diketone. The fraction boiling between 144 and 170° C. at 1 mm. pressure was cooled to room temperature, the product thereby solidifying. It was fractionally crystallized from a mixture of acetone and n-hexane. The pure colorless needles so obtained were identified as 4,4'-diketodicyclohexyl (M. P. 114–115° C.) having the structural formula

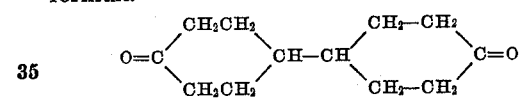

In addition to the above-described example, this invention may be used in the preparation of the following compounds, some of which are known and some of which are quite new.

3,3'-diketo-dicyclohexyl
Di-4-ketocyclohexyl ether
Di-2-ketocyclohexyl sulfide

The diphenols are hydrogenated by heating, preferably at temperatures between 150 and 250° C. The dehydrogenation is also conducted at elevated temperatures, preferably between 200 and 300° C. Any quantity of finely divided copper chromite may be used, but between 10 and 30 percent is preferred.

Although the invention has been described with respect to specific embodiments, it is not intended that the details thereof shall be construed as limitations on the scope of the invention except to the extent incorporated in the following claims.

I claim:

1. The process of producing 4,4'-diketodicyclohexyl which comprises dehydrogenating 4,4'-dihydroxydicyclohexyl dissolved in phenyl ether in the presence of copper chromite.

2. The process of producing 4,4'-diketodicyclohexyl which comprises dehydrogenating 4,4'-dihydroxydicyclohexyl dissolved in phenyl ether in the presence of finely divided copper chromite at a temperature between 260° and 270° C. for 2 to 3 hours.

JOHN R. SCHAEFGEN.

REFERENCES CITED

The following references are of record in the file of this patent:

UNITED STATES PATENTS

| Number | Name | Date |
|---|---|---|
| 1,895,516 | Lazier | Jan. 31, 1933 |
| 2,087,691 | Lazier | July 20, 1937 |
| 2,088,425 | Lazier | July 27, 1937 |
| 2,163,284 | Lazier | June 20, 1939 |
| 2,392,864 | Schoeller | Jan. 15, 1946 |